United States Patent Office 3,487,132
Patented Dec. 30, 1969

3,487,132
PRODUCTION OF POROUS PLASTIC MATERIALS BY MEANS OF DIELECTRIC HEATING
Burt Thorne, Brantome, France
No Drawing. Continuation of application Ser. No. 456,045, May 17, 1965. This application Apr. 19, 1968, Ser. No. 722,807
Int. Cl. B29d 27/00; B29g 7/02
U.S. Cl. 264—25                          7 Claims

ABSTRACT OF THE DISCLOSURE

A method for producing porous plastic materials without a chemical reaction comprising heating the material by directing radio frequency energy at the material to heat it sufficiently to cause the particulate material to adhere together at the points of contact. The method uses nonfoamable thermoplastic or thermoset material and does not require application of pressure to the material.

---

This application is a continuation of applicant's U.S. application Ser. No. 456,045, filed on May 17, 1965, and now abandoned.

This invention relates to a method for producing porous plastic articles from plastic powders or granules by the sole application of radio frequency energy, without use of additives employed to establish or facilitate adherence between the particles. No chemical reaction is entailed, the adherence being induced through physical rather then chemical transformation. The method is applicable to both thermoplastics and thermosets which, when in powder or granular form, have particles enjoying reasonable rigidity; thermosets in an overly fluid state cannot be employed for the purposes of this invention unless they can first be partially cured so as to attain an acceptable degree of rigidity.

Porous plastics are made usually with the aid of blowing or foaming agents, by the introduction of soluble foreign matter which is leached out subsequently, or by piercing. Apart from the latter method—with its concomitant inconvenience of straight-through pores and the ability of most plastics to re-close or at least partially close the voids so formed—relatively costly production processes are involved, and in the first-named process the walls separating the pores may be inconveniently and uncontrollably thin.

A simpler process would be that of sintering, classically employed in the metallurgical and ceramic industries, but it will be evident that the concomitant pressure employed would reduce or eliminate porosity from a plastic mass whose particles were in a semi-fluid or a softened albeit unmelted state. Attempts have been made with thermoplastics to circumvent this problem by eliminating the application of pressure, which in turn leads to prolongation of the heating cycle; aside from the evident economic disadvantage such a prolongation augments the risk that the softened particles will have to change shape through flow (even when all or almost all vibration has been eliminated) due to the effect of their own weight, molding themselves on one another in such a fashion as to reduce or eliminate porosity. Another danger is the formation of a "skin" or thin layer of fused particles at the upper and/or lower surface, where the temperature is necessarily highest when external heating methods are employed, thereby eliminating porosity at the surface while simultaneously preventing the heat from attaining the inner particles in sufficient degree to allow coalescence at their points of contact; thus, only relatively thin porous sections can be produced by external heating methods.

A further inconvenience is to be found in the difficulty of obtaining rapid and simultaneous entry of an equal quantity of heat energy at both surfaces when the lower surface is resting on a solid (usually a heated metal) and the upper surface is exposed to a gas (usually heated air).

The present invention exposes the platsic powder or granules to radio frequency energy (dielectric heating), thereby having the particles act as a dielectric and so generate heat internally, uniformly, and extremely rapidly, in accordance with the dielectric properties of the particular plastic employed and the frequency and power output to which it is subjected. Advantages are as follows:

Heating is very evenly distributed and in most cases virtually instantaneous (less than ¼ second);

Articles or products of great thickness may be produced;

Set-up time is short and warm-up time of the equipment virtually inexistent, as compared to that required for a conventional oven or tunnel;

Both continuous and intermittent production are practical;

Severely reduced production cycle time and greatly increased flexibility in changing the item under production allows severely reduced stocks of finished products;

Skill required for operation is low and for maintenance is moderate;

All types of molds may be employed: textured, stepped, very long, very large, and very deep;

Cost of molds is moderate, and their life is long;

Product repeatibility is excelelnt, usually more accurate than the dimensional stability characteristics of the plastic itself; and Although restrictions and limitations differ with respect to the two methods different ploymers and/or copolymers can be mixed to a greater extent than is practicable with external heating, since the extreme rapidity of dielectric heating renders it less vulnerable to the differences in softening points.

Raising the frequency will increase the ability of a given plastic to absorb power from a generator, as is evidenced by the equation:

$$P = I'V = 2\pi C_0 f V^2 e''$$

where P is the power dissipated in watts, $e''$ the loss factor, $I'$ the portion of the current flow which is lossy, V the RMS value (effective heating) of the voltage, $f$ the frequency, and $C_0$ the absolute capacitance, in accordance with the equation:

$$C_0 = C/e$$

where C is the capacitance and $e$ is the dielectric constant.

A practical limitation is imposed, however, by the point at which $e''$ begins to decrease as frequency further increases ($e''$ is frequency dependent); moreover, raising the frequency above 60 megacycles often provokes standing waves on larger or complex electrodes. Whereas theoretically feasible it is more onerous (although commercially it may prove more rewarding, since selling price sometimes reflects the difficulty entailed) to apply the present invention to plastics requiring unusually high frequencies in order to undergo suitable heating (i.e., to attain a suitable dissipation factor). Most commercial dielectric apparatus operates at frequencies approaching those allowed for uninsulated radiation by international agreement; for higher frequencies special housing is required so as to limit surrounding radiation. Another disadvantage lies in the diminishing power output as frequency is increased; this diminution is especially severe at the very high frequencies. Equipment able to operate at seay 600 or 2,500 megacycles already is very costly to purchase, and normally its power output is so small as to enable it to cope with only a very small work area. Thus, the present invention probably will find its widest use with those plastics whose dissipation factors in the range of 10 to 30 megacycles enable them to be satisfactorily heated; ease of application, however, is not always correlated directly with financial profit.

Small voltage changes produce considerable changes in effective heating. The degree of conductivity or point of voltage breakdown sets the ultimate upper limit of voltage which may be employed with a given plastic; in practice, since this invention reduces the production cycle to a point where time need no longer be weighed as a critical factor, voltages having a certain margin below the breakdown points are employed for most plastics as a matter of convenience and so as to limit danger of discoloration. Moisture, certain plasticizers, and extraneous matter also limit voltages which can be used safely. Conductive pigments and/or fillers will limit the amounts of radio frequency energy which can be applied. Foreign matter such as metallic shavings, carbon or dirt may cause arcing (short circuiting); other causes may be overly extended cycles, excessive power, horizontal extension of the overhanging electrode beyond the edge of the work, ionization of the air next to the work, and uneven leveling of the powder which leads to thin spots or small direct holes through the work.

To limit surface flashing (i.e., a voltage breakdown or corona effect) the electrode should "bottom" and thus minimize the air-gap. The plastic in powder or granular form is supported by the "bed" of a dielectric heating apparatus; the bed may be stationary or moving, including endless belts or molds conveyed thereon. The electrode is descended to the upper level of the work without actually pressing upon the plastic powder, as such pressure would pack the particles more closely and deform them in some degree at the time of heating, thereby reducing porosity.

Surface flashing may be further limited by not having the power rise instantaneously; maximum voltage applied is determined by the voltage breakdown characteristics and the thicknesses ultimately attained. Despite precautions against pressure and vibration the layer is inevitably of reduced thickness after heating, if only because of the collective effective of blunting the more pointed or acute protrusions of the particles; to reduce or eliminate the ensuing air-gap the electrode may be lowered so as to follow as the upper surface of the work descends. Surface flashing or initial arc-gap flashing also may be reduced by upping the dielectric generator's frequency; limiting factors are the equipment's cost, limitation of outside radiation effects in accordance with international agreement, and standing wave incidence with electrodes having sizeable surfaces.

The technique known to the art as "step-starting" may be employed to restrict surface flashing; it consists of increasing the generator's output from the beginning of the heating cycle up to the point where partial fusion of the plastic particles is attained, or to where final curing is effected in the case of thermosets. The oscillator tube's filament runs at a lowered potential during intervals of non-production. When operation (heating) is desired voltage applied to the filament is increased to normal operating potential; simultaneously high voltage direct current is applied to the oscillator tube's anode. As the filament possesses considerable thermal mass there is a slight lag before it attains normal operating temperature known to the art as the "step-starting time." The low emission during periods of inactivity (reduced voltage) has only a minimal effect on the filament, i.e., on the oscillator tube's life. Current commercial apparatus offers step-starting with applied voltage of the oscillator tube's filament at stand-by at normal operating voltage, or with it at stand-by with a considerably reduced voltage.

Large quantities of current must flow through the electrodes because of the lower power factor levels of most plastics; otherwise fusion or curing will not occur at the points of contact between the particles. The amounts of current and duration of its application must be controlled within tolerances which permit thermoplastic particles to gain sufficient adherence to one another without melting or softening to a degree which leads to obstruction of the voids or pores and unduly reduces porosity. Both technical and economic considerations require exposure time to be held to a minimum while at the same time avoiding rejects due to insufficient particle adherence; it may be noted, however, that in the latter case part or all of the product is still in the form of powder and so recuperable, whereas overheating will produce an unporous or insufficiently porous mass or may cause discoloration which, while not affecting porosity, is objectionable in some cases because of appearance. The degree of plasticization (including so-called internal plasticization of the copolymers) should be taken into account where, as is usual, it causes readier deformation and readier heating; in general a high degree of porosity may be attained more easily by heating unplasticized (i.e., more rigid) plastics and plasticizing subsequently, if the object and effect of introducing the plasticizer is the common one of obtaining a greater degree of flexibility. Vinyl chloride-acetate copolymer, for example, can be plasticized to any desired degree of flexibility.

Within the radio frequency field the work's temperature rises uniformly except, perhaps, at the upper and lower surfaces; this effect is attenuated as intermittent (but not continuous) production continues by virtue of the bed absorbing heat from the work itself, thereby approaching and approximating its temperature. The upper surface continues to receive a slight cooling effect from the narrow gap of air which separates it from the above electrode, and as a result some of the top particles may fail to adhere. Even when there is loss from both the top and bottom surfaces the reduction in thickness attributable to this cause is negligible (and virtually immeasurable). Heating the bed and/or air-gap is undesirable since this type (external) heating increases the aforementioned risk of particle deformation and is undesirable for economic considerations as well.

With dielectric heating the work attains its highest temperature at the point of contact between the particles, probably because these points conduct a greater amount of current than do the air masses or gaps lying between the rest of the particles' surfaces. This phenomenon—whether or not the foregoing hypothesis is valid—allows maximum adherence between particles together with minimum particle deformation, as compared to results obtained with external heating methods.

The work may be insulated from the relatively cool bed by such materials as asbestos rock board of sufficient thickness to prevent arcing through to metal supports, impregnated paper-phenolic laminate, electrical grade fish paper which is economical and has a reasonable life expectancy, but rises rapidly in temperature and so is limited to use with thermosets and with thermoplastics having a relatively high softening point, polytetrafluoroethylene such as, impregnated or surfaced paper, etc. Molds may be of fused silica (silicon dioxide), polytetrafluoroethylene, certain phenolic resins, and lignocellulose hardboard.

As previously mentioned, electrodes having large surfaces are subject to a phenomenon known as standing waves; the latter are evidenced by uneven heating in given areas, apparently because of uneven voltage distribution across the electrode's surface. Experimentation can lead to avoiding or attenuating standing waves, for example by rotating the electrode 90°, thereby placing troublesome capacity and inductance transverse to the source of excitation. Another method is to employ "stubs" or small inductances along the outer edge of the electrode so as to compensate voltage rises due to transmission line effects; the positioning and number of "stubs" is determined empirically.

On commercial equipment generating output power of from 10 to 30 kilowatts work generally should require less than ¼ second exposure, and 4 seconds may be considered a maximum. Thereafter thermal losses to surrounding structures are such as to be uneconomical and may prove detrimental to porosity, as well. If satisfactory heating and good adherence of the particles can not be obtained within 4 seconds it is preferable to increase output power rather than the time of exposure. With equipment of power output lower than 10 to 30 kilowatts a more prolonged heating cycle must be employed; for example, satisfactory specimens were obtained from plastic powders with the frequency approximating 20 megacycles, as follows:

Vinyl chloride-acetate copolymer—7, 8, 9, 10, 11 and 12 seconds @ 800 watts

Acrylonitrile-butadiene-styrene copolymer—60 and 70 seconds @ 200 watts

Polyvinylchloride—12 seconds @ 800 watts and 70 seconds @ 200 watts

The two copolymers are "internally" plasticized, but otherwise the plastics employed above were without plasticizer, filler, or colorant.

Refrigeration immediately after heating of thermoplastics forestalls danger of deformation due to movement, vibration and/or pressure while still in a heated state, and it effects economies in other equipment cost, floor space, and production cycle, as the product (unless a thermoset) must regain ambient temperature before it can be removed and handled without fear. This is especially true of continuous production, where the absence of refrigeration requires an unseemly extension of the endless belt. Suitable precautions must be taken in introducing the plastic onto the endless belt or into molds so as not to jar or pack down the powder, thereby ultimately reducing porosity in the finished product.

Porosity of thermoplastics may be reduced intentionally by prolonging the heating cycle, and it may be eliminated in delimited areas by the application of heat and pressure or of pressure alone if the product has not yet cooled. Flames, hot gas jets, further dielectric heating or other sources of heat energy may be employed with thermoplastics if the area of application is well controlled so as to avoid unwanted side effects (elimination or excessive reduction of porosity in areas other than that desired); heated dies may be used where the intention, in addition to eliminating porosity in a given area, is to change the configuration. Dielectric heating, hot gas jets, flames or hot surfaces may be used to weld the thermoplastic product to itself or to other suitable materials, evidently with the loss of porosity in the area of the weld.

With proper precautions against packing down and undue softening the degree of porosity attained through application of the present invention is high, although the irregular form of the particles precludes attaining the ideal (i.e., that attainable with particles in the form of perfect spheres of identical size), being of the order of 40 to 45%. In general the average diameter of the pores approximates one-half average diameter of the particles employed.

This invention may be employed for the purpose of producing:

Medical splints and supports affording aeration to the injured member or surface;

Diaphragms and filters and gases and liquids (alone or in conjunction with other porous and/or fibrous products; as the product of the invention may be either rigid or flexible at will—through plasticization—it may serve as either the supporting or the supported part of the combined filter or diaphragm);

Welded and unwelded (seamless) porous tubing and piping (again, as with filters and diaphragms, the product may either support or be supported by other porous tubes and pipes placed within or outside it);

Noise and shock dampeners (by attenuating the force of a surge of gas or liquid);

Internal separators of plates in storage batteries;

Porous films, sheeting, and "foams" (again, rigidity of the films, sheeting, and "foams" may be reduced through aerators for aquariums);

Diffusers of gas in other gases and in liquids (example: aerators for aquariums);

Diffusers of liquids in other liquids;

Inclined platforms for the gravitational displacement or transportation of powder by rendering it fluid: the powder is raised above the surface of the platform and made fluid by virtue of air (or any other gas) pressure emanating from beneath the platform and through its pores, the pores permitting the air under pressure to pass at a reduced and regularized rate; and Separators are interleafs for leaf springs (the product can be immersed in liquid lubricants or forced to accept solid lubricants into its pores, thereby rendering further lubrication unnecessary for the life of the spring).

As in the case of non-porous plastics the specific plastic chosen for use in a given application of this invention will be governed by such varying criteria as the cost (as compared to that of other acceptable plastics), its resistance to given chemical and/or physical exposure, other properties and characteristics such as appearance and moldability, the market aimed at, etc., but in addition there will be further considerations as to availability in powder or granular form or the readiness with which the specific plastic can be reduced to this form, along with its suitability for dielectric heating.

For the purposes of this invention the following terms have the meaning or definition indicated:

Bed—the surface supporting the work;

Work—the plastic powder or granules which it is desired to convert into a porous mass through heating;

Thermoplastic (noun)—a plastic which is remeltable;

Thermoplastic (adjective)—the property of softening repeatedly upon reapplication of heat and of rehardening upon cooling;

Dielectric (noun)—matter which acts as an electrical insulator when exposed to a given (high) frequency; and Dielectric (adjective)—the property of transmitting the effects of low conductance when exposed to a given (high) frequency, or as pertaining to equipment or phenomena employed in generating this frequency or inducing this property (e.g., the "dielectric" generator, the "dielectric" field).

What I claim is:

1. A process for producing a porous body from particulate plastic material consisting of:
    (a) placing between two electrodes a substantially dry unfoamable plastic particulate subject to dielectric heating,
    (b) applying controlled radio frequency energy across said electrodes with sufficient power to cause rapid heating of the individual plastic particles at their points of contact to form said porous plastic body, and
    (c) refrigerating said porous body immediately after said heating to avoid subsequent deformation of said plastic and thereby maintaining the porosity of said body.

2. The process of claim 1 in which the plastic material is a moldable thermoset plastic.

3. The process of claim 1 in which the plastic material is a thermoplastic plastic.

4. The process of claim 1 comprising continuously feeding the plastic particulate on a moving conveyor between the two electrodes.

5. The process of claim 1 in which the frequency of the applied radio frequency energy is 10 to 30 megacycles and said energy is applied for a period from less than one quarter to seventy seconds.

6. The process of claim 1 in which the two electrodes are in upper and lower positions and causing the upper electrode to descend at a rate equal to that of the upper surface of said plastic particulate due to shrinkage of the plastic during said heating.

7. The process of claim 1 in which the plastic particulate is selected from the group consisting of vinyl chloride-acetate copolymer, acrylonitrile-butadiene-styrene copolymer and polyvinylchloride, and the applied radio frequency energy is at a power of 200–800 watts at 20 megacycles for a time of seven to seventy seconds.

References Cited

UNITED STATES PATENTS

| | | | |
|---|---|---|---|
| 2,364,790 | 12/1944 | Hemming | 219—10.41 X |
| 2,459,225 | 1/1949 | Hickok | 219—10.41 |
| 2,602,133 | 7/1952 | Gard | 219—10.41 |
| 2,617,752 | 11/1952 | Van Hauteville | 219—10.41 X |
| 2,966,469 | 12/1960 | Smythe et al. | 219—10.41 X |
| 3,010,157 | 11/1961 | Cizek | 219—10.41 X |

FOREIGN PATENTS

| | | |
|---|---|---|
| 607,690 | 9/1948 | Great Britain. |
| 750,239 | 6/1956 | Great Britain. |

ROBERT F. WHITE, Primary Examiner

J. R. HALL, Assistant Examiner

U.S. Cl. X.R.

219—10.41; 264—28, 126

PO-1050
(5/69)

UNITED STATES PATENT OFFICE
CERTIFICATE OF CORRECTION

Patent No. 3,487,132          Dated December 30, 1969

Inventor(s) BURT THORNE

It is certified that error appears in the above-identified patent and that said Letters Patent are hereby corrected as shown below:

Column 2, line 29, change "excelelnt" to --excellent--;
Column 2, line 69, change "seay" to --say--;
Column 6, line 3, change "aerators for aquariums" to --plasticization, if desired--;
Column 6, line 14, change "and" to --or--.

SIGNED AND
SEALED
JUN 23 1970

(SEAL)
Attest:

Edward M. Fletcher, Jr.
Attesting Officer

WILLIAM E. SCHUYLER, JR.
Commissioner of Patents